UNITED STATES PATENT OFFICE.

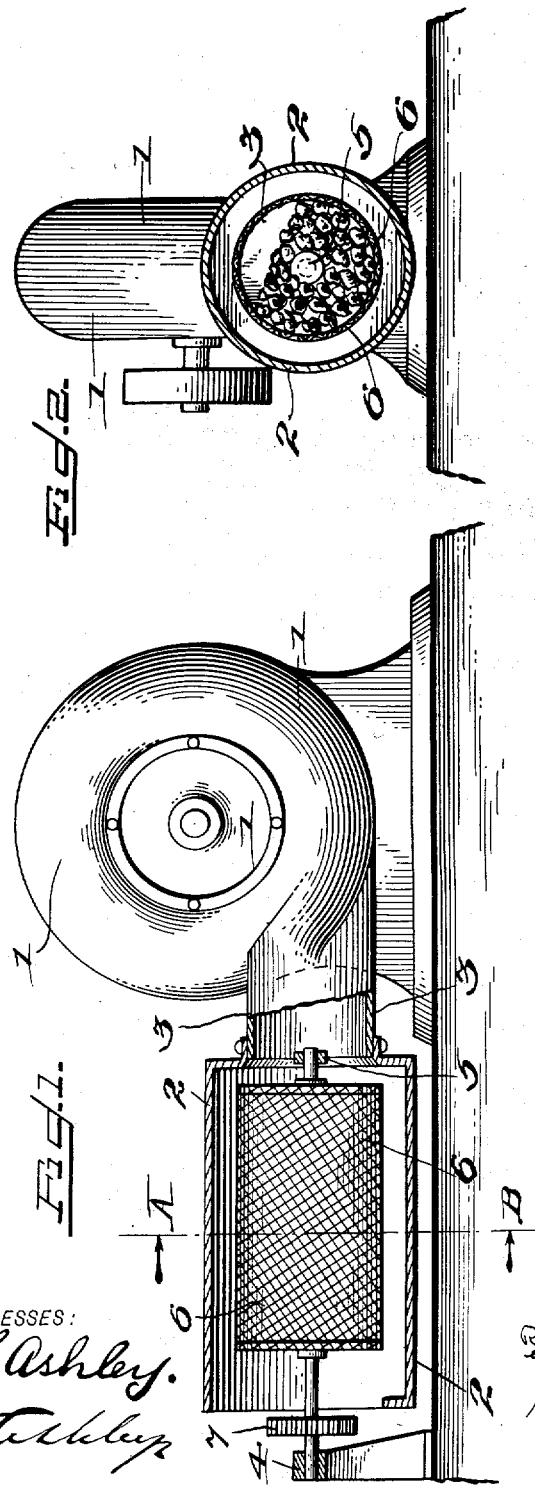

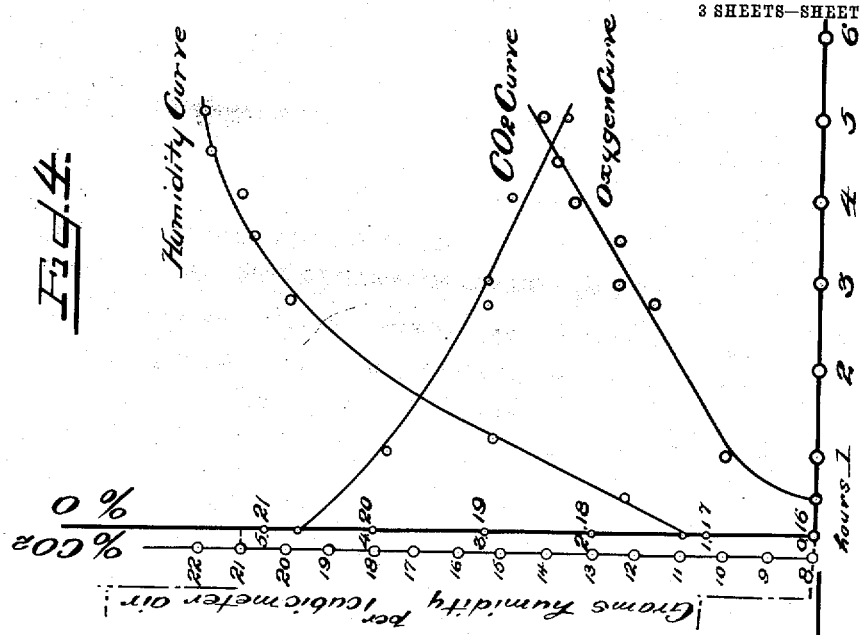
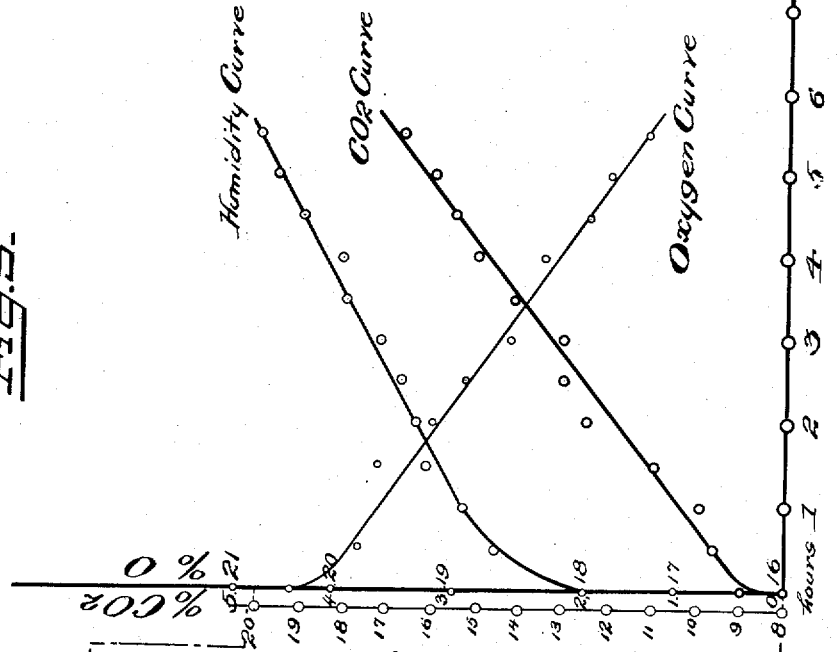

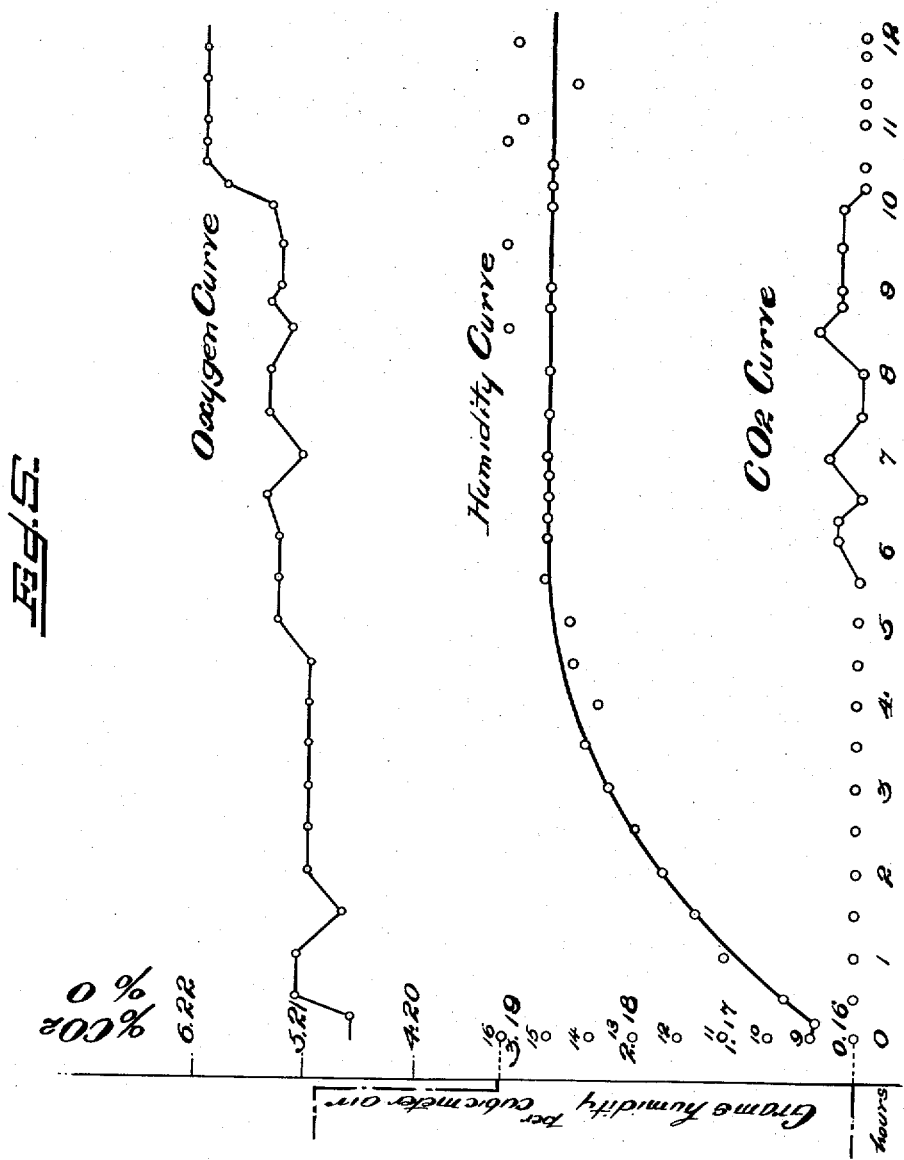

RICHARD V. FOREGGER, OF NEW YORK, N. Y., AND GEORGE FRED BRINDLEY, OF NIAGARA FALLS, ONTARIO, CANADA, ASSIGNORS TO THE ROESSLER & HASSLACHER CHEMICAL COMPANY, OF NEW YORK, N. Y., A CORPORATION OF NEW YORK.

PROCESS OF REGENERATING AND PURIFYING AIR.

No. 853,402.      Specification of Letters Patent.      Patented May 14, 1907.

Application filed March 9, 1906. Serial No. 305,143.

*To all whom it may concern:*

Be it known that we, RICHARD VON FOREGGER, a subject of the Emperor of Austria, and a resident of New York city, New York, and GEORGE FRED BRINDLEY, a subject of the King of Great Britain, and a resident of Niagara Falls, Province of Ontario, Canada, have invented a certain new and useful Process of Regenerating and Purifying Air, of which the following is a specification.

Our invention relates to a process for the regeneration and purification of air in which the vitiated air is caused to pass over a suitable compound adapted to generate oxygen and at the same time absorb or purify the toxic parts of the vitiated air.

The compound we prefer to use is a fused alkaline peroxid, or mixtures containing the same, and particularly fused sodium peroxid. No artificial reagent is necessary to produce the desired reaction, the only necessary reagent being such degree of humidity in the air as would be normally found in air exhaled by living beings.

One application of our invention would be in connection with the constant and automatic regeneration and purification of air in a submarine boat, or similar closed chamber. With relation to the regeneration and purification of air in submarine boats this has in the past been partially accomplished by carrying heavy cylinders of compressed air or oxygen to replace the amounts used up, the fouled air being exhausted through the propeller shaft, or the carbon dioxid portion above absorbed by a caustic alkaline solution, the other toxic portions remaining unchanged or unaffected.

By our invention a considerable reduction in weight is obtained and a simplification in that one means fulfils both the regenerating and the purifying functions, that is, the supplying of oxygen, the absorption of carbon dioxid and the purifying the air of its other toxic constituents, the continuous maintenance of oxygen and carbon dioxid within the limits fixed by nature being accomplished with complete certainty.

When air containing moisture and carbon dioxid is drawn or passed over a fused alkaline peroxid, for instance fused sodium peroxid, the moisture of the air reacts with the compound setting free oxygen and forming caustic soda which absorbs the carbon dioxid. These reactions may be represented theoretically by the following equations:

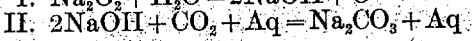

I. $Na_2O_2 + H_2O = 2NaOH + O$
II. $2NaOH + CO_2 + Aq = Na_2CO_3 + Aq$

We have found that if there is an excess of carbon dioxid present in the air after this reaction has been going on for some time the alkaline peroxid becomes coated with carbonate or bi-carbonate and finally the reaction freeing oxygen and absorbing carbon dioxid ceases. Thus this practice of drawing or passing the air over alkaline peroxid could only be used in places where humidity without any considerable amount of carbon dioxid is present. This is illustrated by the following experiment: An electrically driven blower was fitted at the discharge end with a cylinder large enough to hold several pounds of peroxid in lumps of one-half to one inch cube. When operating the blower in a room in which enough circulation prevailed through crevices in the windows, etc., the reaction of the moisture on the peroxid was a continuous one without the formation of a crust of carbonates.

In the drawings Figure 1 is a side elevation partly in section, and Fig. 2 is a front elevation of one form of apparatus adapted for use in connection with our process. Figs. 3, 4 and 5 are diagrammatic or graphic representations of curves showing the results of the experiments hereinafter described.

The following experiment will serve as an illustration of the normal conditions existing without the intervention of any regenerating or purifying process. Several rabbits were placed in an air tight box 3x3x6 feet and the contained air was analyzed at frequent intervals. The curve illustrated in Fig. 3 shows the decrease of oxygen and increase of carbon dioxid during the duration of the experiment.

The apparatus above described comprising the electrically driven blower having the cylindrical container filled with alkaline peroxid attached to the discharge end, was placed in the box with the rabbits and operated and the contained air analyzed as before. The curve illustrated in Fig. 4 shows the results thus obtained. It will be observed that the air was kept fresh longer than in the experiment where no regenerative apparatus was used. Nevertheless the air was not kept perfectly pure, and we discovered that this was due to the formation of a crust or coating of carbonate or bi-carbonate of sodium on the surface of the lumps of peroxid, as described, which prevented the continuous reaction with the moist air. We discovered that by providing means whereby the alkaline carbonate or bi-carbonate may be continuously removed from the peroxid the reaction by which the oxygen is set free and carbon dioxid absorbed proceeds without interruption. We shall describe one method of accomplishing this result, but it is understood that we do not confine ourselves to this method as it is only illustrative.

In Figs. 1 and 2 is shown a blower 1 having a fixed cylinder 2 attached to the discharge end 3 thereof. Suitably journaled within the cylinder on bearings 4 and 5 is a cage 6 of wire netting adapted to be partly filled with lumps of the peroxid. A gear 7 is adapted to be actuated in any convenient manner for turning the cage 6 and thus tumbling the contents thereof. In turning the cage 6, either continuously or intermittently, the tumbling around of the pieces of peroxid will remove the carbonate crust. The loose or used portion of the mass, being partly caustic soda and partly sodium carbonate, in a moist state, will drop through the netting of the cage 6 into cylinder 2 where it will still continue to absorb carbon dioxide. Placing the apparatus just described in the air tight box with the rabbits we made another experiment, the resulting curve being shown in Fig. 5. It will be seen that in this experiment the air contained more oxygen at the end of the experiment than at the beginning. In this latter experiment, after a twelve hour run, the conditions of humidity, oxygen, carbon dioxid, and purity of the air, with the exception of the temperature which was higher than at the start, were kept almost constant from the beginning. We have also discovered that we can regulate the amount of oxygen in the air, either increasing it above normal or letting it go below normal, by regulating the speed of rotation of the cage containing the peroxid or by regulating the removal of the crust of carbonate or bi-carbonate from the peroxid.

In connection with the apparatus it may sometimes be desirable to regulate the moisture in the air by any suitable means, such as by placing water in the lower part of cylinder 2.

It is obvious that many means of practicing the process may be provided and we do not restrict ourselves to the means disclosed, nor do we confine ourselves to the utilization of fused sodium peroxid, as it is obvious that the compound may be of other peroxid than sodium peroxid and in other forms than fused, such as compressed tablets or a powder and that other substances may be used in connection therewith without departing from the spirit of the invention.

Having described our invention what we claim and desire to secure by Letters Patent of the United States is:—

1. A process of regenerating and purifying the air of a chamber consisting in passing said air in a continuous stream under pressure over an alkaline peroxid in a solid state whereby the humidity of the air may react with the peroxid to free oxygen and absorb carbon dioxid.

2. A process of regenerating and purifying the air of a chamber, said air containing moisture, consisting in passing said air in a continuous stream under pressure over fused sodium peroxid in a solid state.

3. A process of regenerating and purifying the air of a chamber, said air containing moisture, consisting in passing said air in a continuous stream under pressure over an alkaline peroxid in a solid state while agitating the peroxid.

4. A process of regenerating and purifying air consisting in the generating of oxygen gas and the absorbing of carbon dioxid by the reaction of the humidity contained in the air alone on sodium peroxid in a solid state while agitating the peroxid.

5. A process of regenerating and purifying air, said air containing moisture, consisting in passing said air in a continuous stream under pressure over an alkaline peroxid in a solid state while agitating the peroxid and regulating the generation of oxygen by the relative agitation of the peroxid.

In witness whereof we have hereunto signed our names in the presence of two subscribing witnesses.

RICHARD V. FOREGGER.
GEORGE FRED BRINDLEY.

Witnesses:
SEABURY C. MASTICK,
ROBERT W. ASHLEYS.